United States Patent
Savage

(10) Patent No.: US 10,257,980 B1
(45) Date of Patent: Apr. 16, 2019

(54) NUT ROW HARVESTER

(71) Applicant: Savage Equipment Incorporated, Madill, OK (US)

(72) Inventor: Basil W. Savage, Madill, OK (US)

(73) Assignee: Savage Equipment Incorporated, Madill, OK (US)

( * ) Notice: Subject to any disclaimer, the term of this patent is extended or adjusted under 35 U.S.C. 154(b) by 0 days.

(21) Appl. No.: 14/798,108

(22) Filed: Jul. 13, 2015

(51) Int. Cl.
*A01D 57/20* (2006.01)
*A01D 51/00* (2006.01)

(52) U.S. Cl.
CPC .......... *A01D 57/20* (2013.01); *A01D 51/002* (2013.01)

(58) Field of Classification Search
CPC ...... A01D 57/20; A01D 46/22; A01D 51/002; A01D 51/00
USPC ....................................... 56/328.1
See application file for complete search history.

(56) References Cited

U.S. PATENT DOCUMENTS

| | | | |
|---|---|---|---|
| 501,515 A * | 7/1893 | Johnson | E01H 1/042 15/84 |
| 972,910 A * | 10/1910 | Pippen | A01D 17/10 171/101 |
| 1,378,275 A * | 5/1921 | Rademacher | A01D 51/002 198/520 |
| 2,508,454 A * | 5/1950 | Goodwin | A01D 51/002 172/96 |
| 2,514,945 A * | 7/1950 | Fortier | A01D 51/002 15/84 |
| 3,107,475 A * | 10/1963 | Gustafson | A01D 51/00 171/17 |
| 3,182,437 A * | 5/1965 | Ramacher | A01D 51/00 209/134 |
| 3,193,998 A * | 7/1965 | Fredriks | A01D 51/002 56/328.1 |
| 3,387,442 A * | 6/1968 | Henson | A01D 51/002 56/328.1 |
| 3,475,889 A * | 11/1969 | Overstreet | A01D 51/002 56/328.1 |
| 3,530,655 A * | 9/1970 | Whitney | A01D 51/002 56/328.1 |
| 3,698,169 A * | 10/1972 | Simpson | A01D 51/002 15/78 |
| 3,828,534 A * | 8/1974 | McRobert | A01D 51/00 56/16.6 |
| 4,014,390 A * | 3/1977 | Teixeira | A01D 17/10 171/124 |
| 4,494,611 A * | 1/1985 | Alvarez | A01B 43/00 171/116 |
| 4,550,465 A * | 11/1985 | Chrisley | E01H 1/106 15/3 |
| 4,593,426 A * | 6/1986 | Chrisley | E01H 1/106 15/3 |
| 4,642,977 A * | 2/1987 | Ramacher | A01D 51/00 56/16.5 |
| 5,001,893 A | 3/1991 | Stanley et al. | |

(Continued)

*Primary Examiner* — Robert E Pezzuto
*Assistant Examiner* — Joan D Misa
(74) *Attorney, Agent, or Firm* — McAfee & Taft

(57) ABSTRACT

A nut row harvester has a nut hopper attached to a conveyor system. The nut row harvester has first and second frame sections that are pivotable relative to each other. A delivery end of the conveyor is moveable from a lower or harvesting position to an upper or dumping position. The nut hopper moves between the upper and lower positions with the end of the delivery conveyor.

13 Claims, 16 Drawing Sheets

(56) References Cited

U.S. PATENT DOCUMENTS

| | | | | |
|---|---|---|---|---|
| 5,247,717 | A | * | 9/1993 | Smith ..................... E01H 12/00 |
| | | | | 15/194 |
| 5,373,688 | A | * | 12/1994 | Stanley ................ A01D 51/002 |
| | | | | 56/328.1 |
| 5,421,147 | A | | 6/1995 | Holden et al. |
| 5,465,562 | A | * | 11/1995 | Croft .................... A01D 51/002 |
| | | | | 56/16.4 R |
| 5,592,805 | A | * | 1/1997 | Croft .................... A01D 51/002 |
| | | | | 56/16.4 R |
| 6,854,255 | B1 | * | 2/2005 | Emerson ................ A01D 46/00 |
| | | | | 56/330 |
| 7,086,216 | B2 | * | 8/2006 | Geraghty ................ E01H 1/106 |
| | | | | 56/344 |
| 7,131,254 | B2 | * | 11/2006 | Flora .................... A01D 51/002 |
| | | | | 56/13.1 |
| 7,412,817 | B2 | * | 8/2008 | Flora .................... A01D 51/002 |
| | | | | 56/328.1 |
| 8,056,177 | B2 | * | 11/2011 | Hammad ............... A01G 1/125 |
| | | | | 15/349 |

* cited by examiner

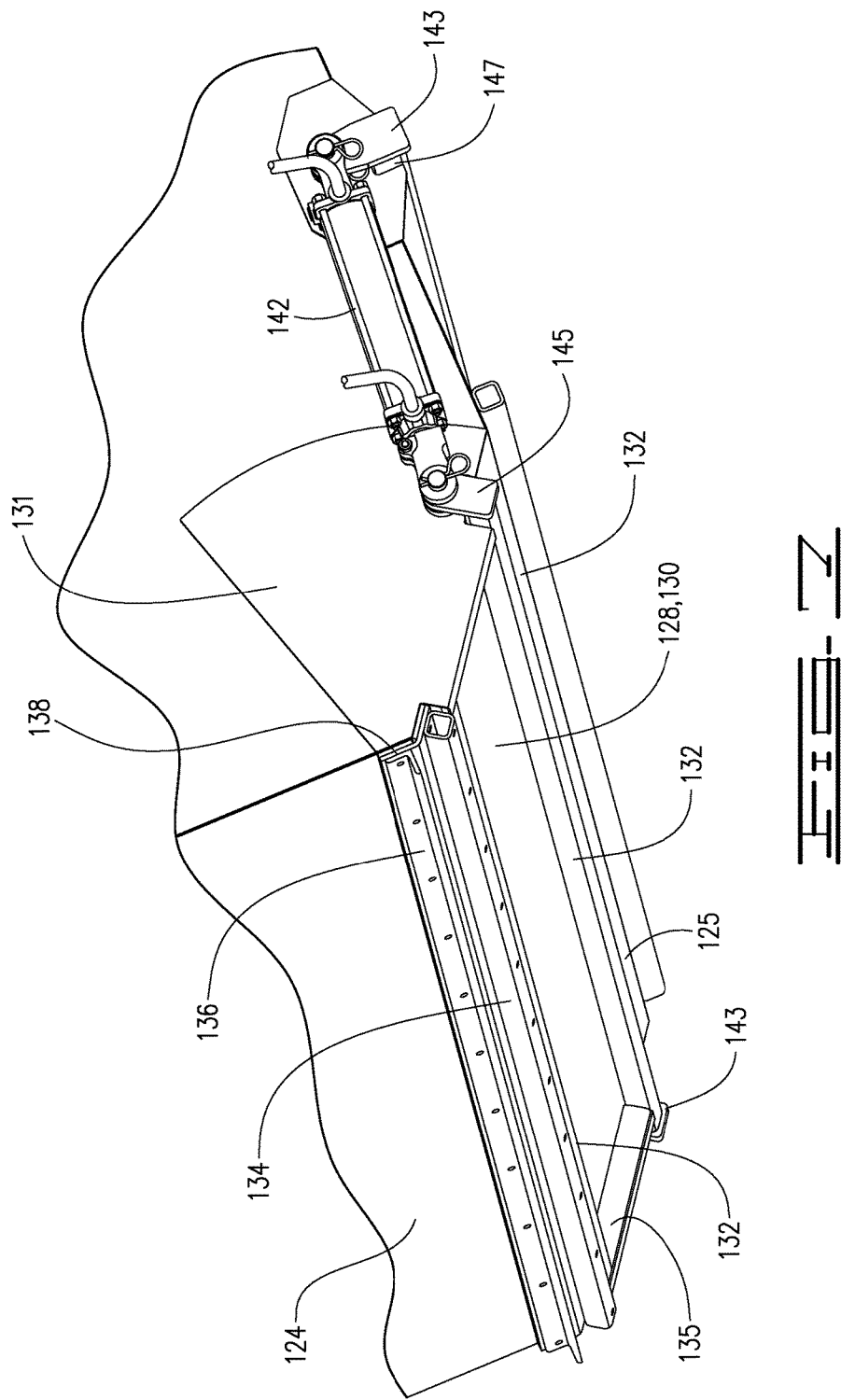

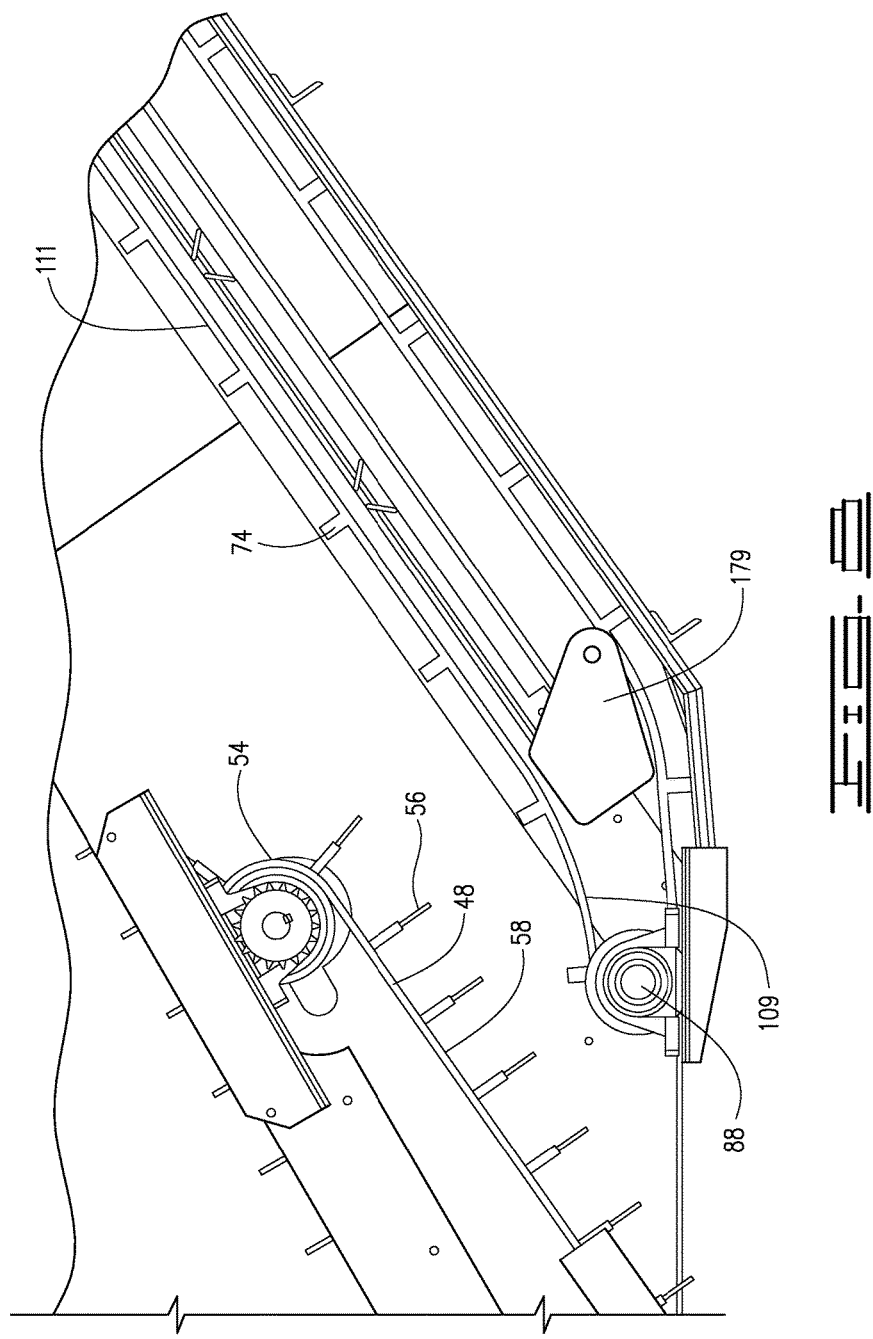

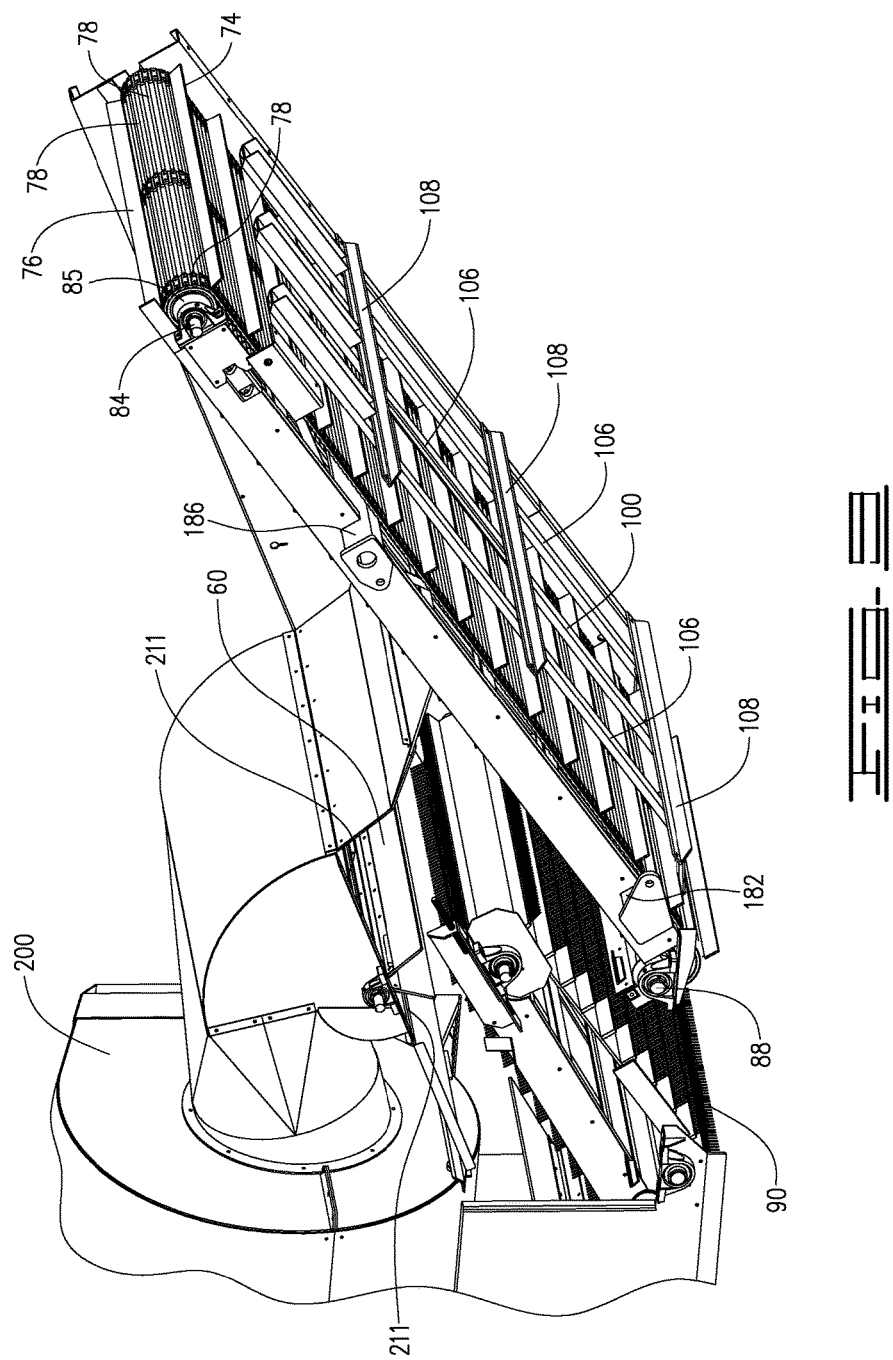

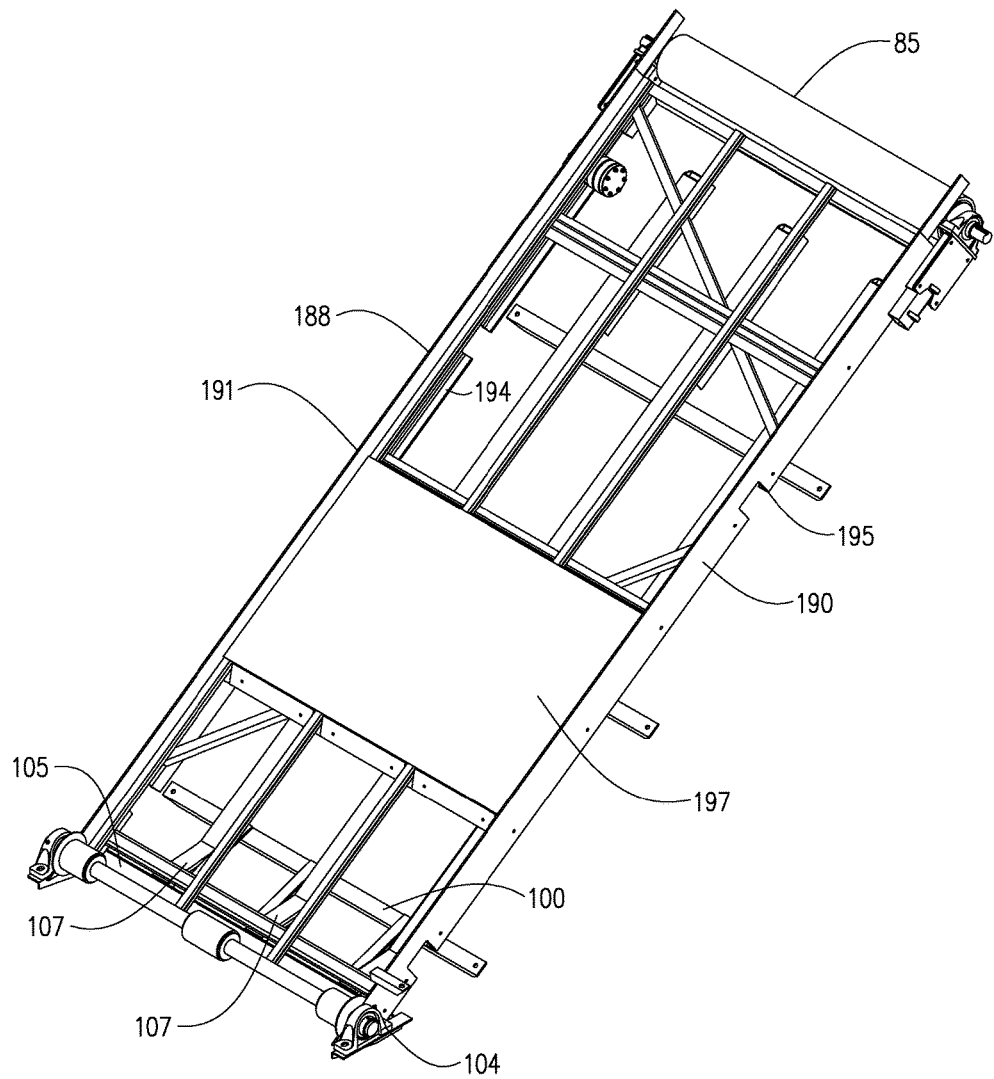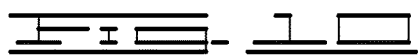

NUT ROW HARVESTER

BACKGROUND

The current disclosure relates to an agricultural harvester for picking up nuts from a ground surface. Existing row harvesters typically pick up nuts and debris that have been formed into windrows between trees in an orchard. The harvester separates at least some debris from the nuts, so that the nuts can be further processed. Nut row harvesters generally include a mobile frame with a conveyor system mounted thereto. Once the debris or at least a portion thereof has been separated, the nuts are carried up the conveyor system and delivered to a trailer therebelow. The trailer is a wheeled trailer connected to a hitch on the mobile frame and pulled along by the nut row harvester. The trailer is connectable and disconnectable from the trailer hitch and is positioned to receive nuts from the conveyor system.

BRIEF DESCRIPTION OF THE DRAWINGS

FIG. 7 is a close up view of the trap door on the collection hopper.

FIG. 8 is a close up showing the overlap of the pickup and delivery conveyors of the row harvester.

FIG. 9 shows the pickup and delivery conveyors.

FIG. 10 is a perspective of a conveyor support frame and conveyor slide.

DESCRIPTION OF EMBODIMENTS

Figure 1:
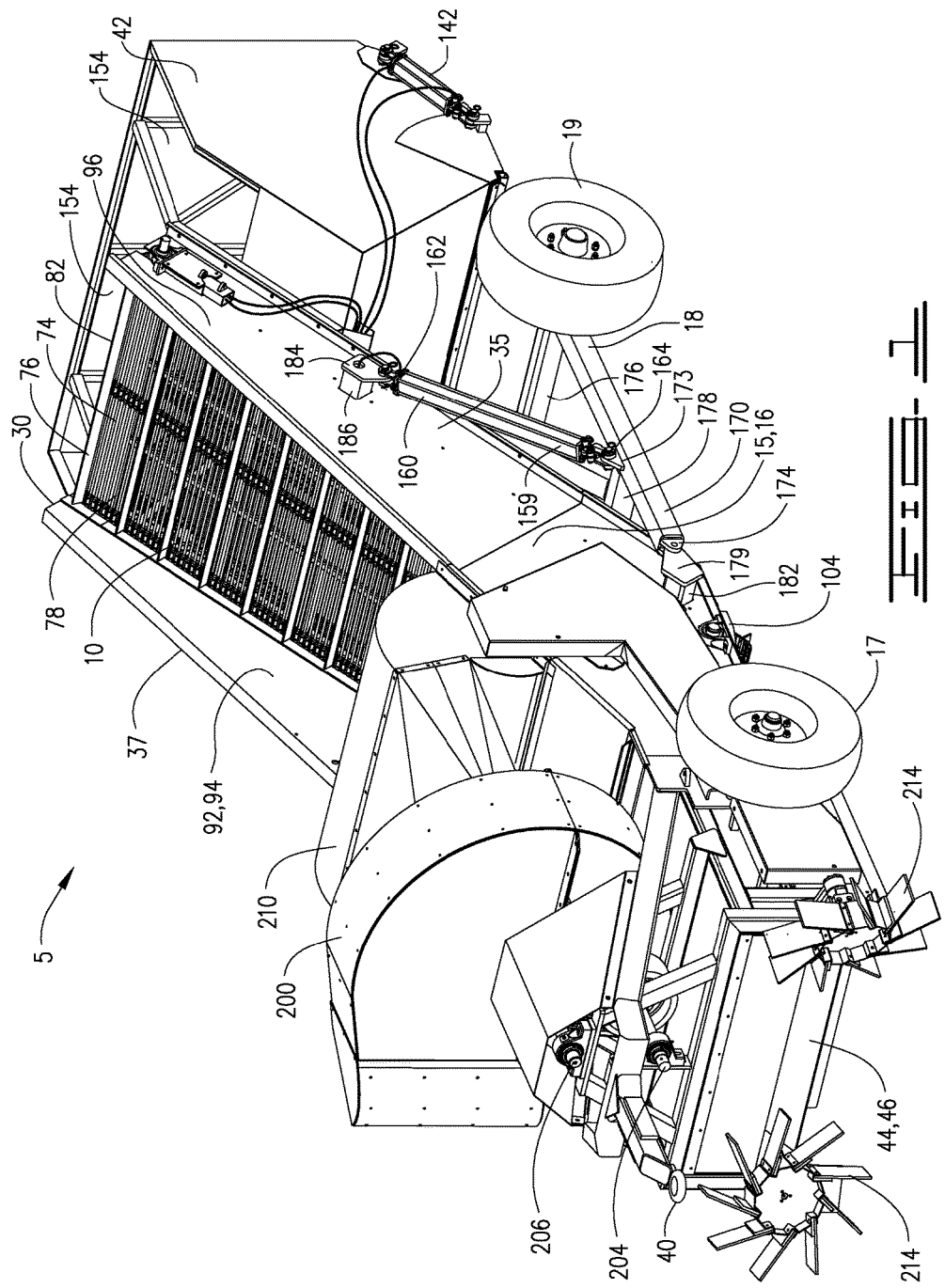
FIG. 1 a perspective view of the row harvester.

Referring now to the drawings, FIG. 1 shows an apparatus 5 which may be referred to as a row harvester 5. Row harvester 5 is adapted to be pulled along behind a vehicle, for example, a tractor 20, and to pick up product, for example, nuts from an orchard floor. Generally, row harvester 5 will be pulled along over rows of nuts, referred to as windrows, that are positioned between rows of trees in a nut tree orchard.

Row harvester 5 includes a conveyor system 10 mounted to a mobile frame 15. Mobile frame 15 comprises a first frame section 16 and a second frame section 18. First and second frame sections 16 and 18 are pivotable relative to each other. Forward wheels 17 and rear wheels 19 are mounted to frame 15. Tractor 20 or other vehicle may be connected to a forward end 25 of mobile frame 15. Mobile frame 15 has a rear 30 and sides 35 and 37. Forward end 25 of mobile frame 15, which is likewise the forward end of row harvester 5 may include a tongue 40 connectable to a pintel connection on tractor 20. A pintel hitch will allow pivoting of the row harvester 5 relative to tractor 20 as is known in the art.

Figure 2:
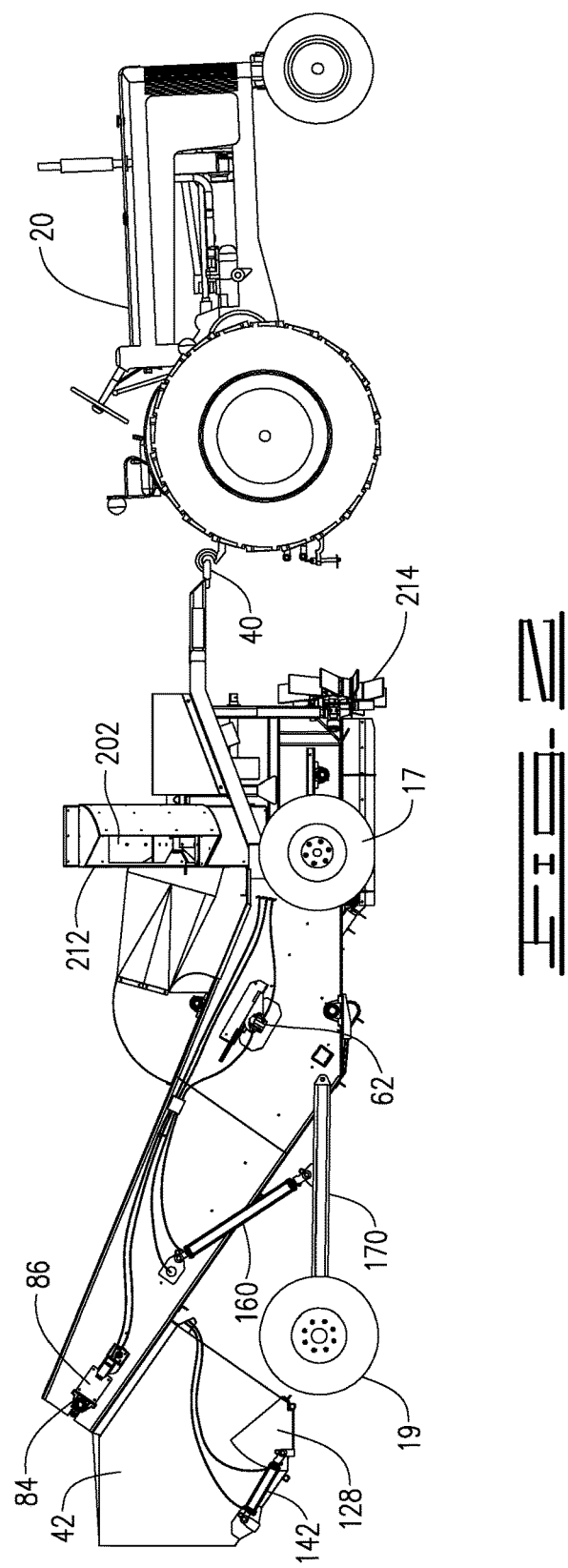
FIG. 2 is a left side view of the row harvester with a tractor connected thereto.
Figure 3:
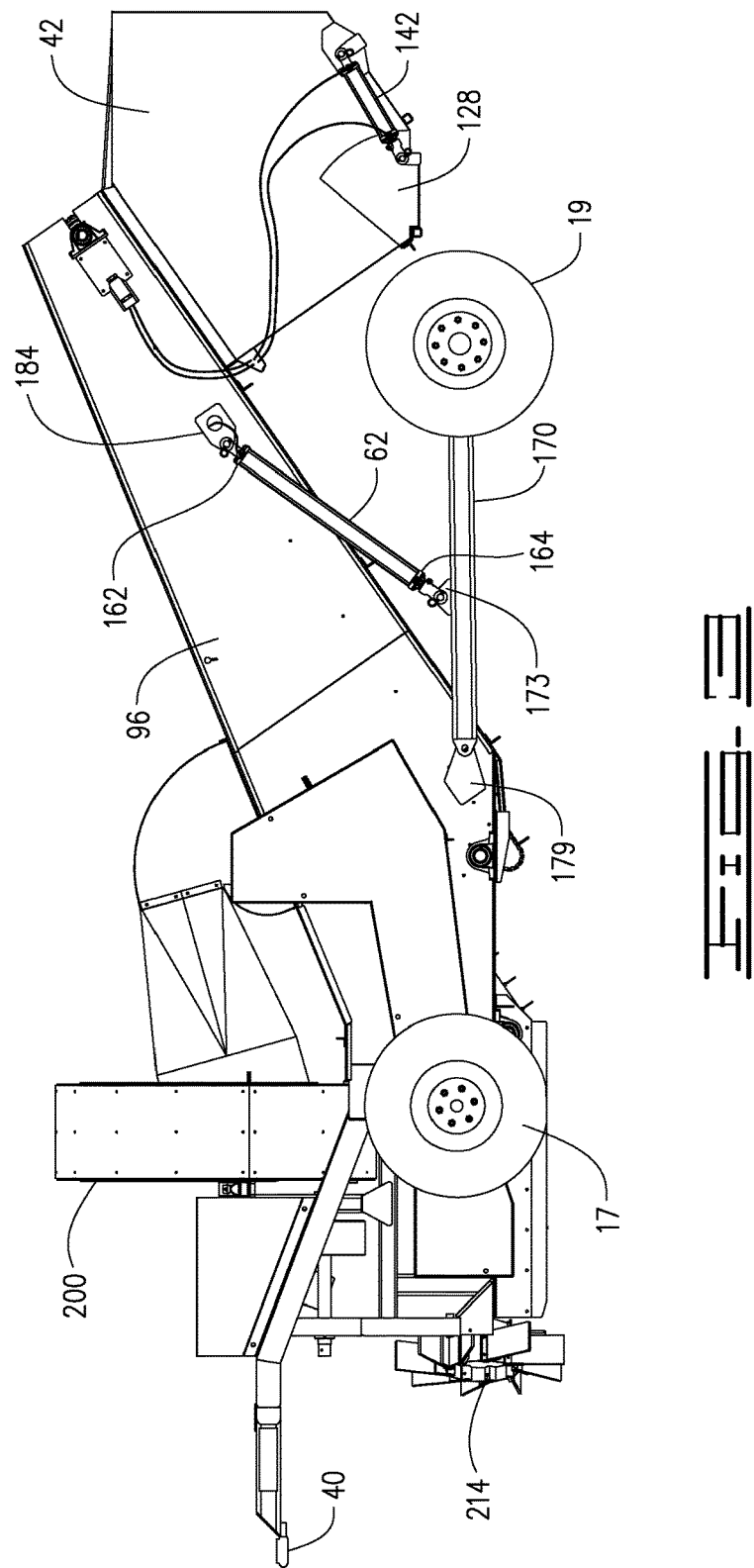
FIG. 3 is a right side view of the row harvester.
Figure 4:
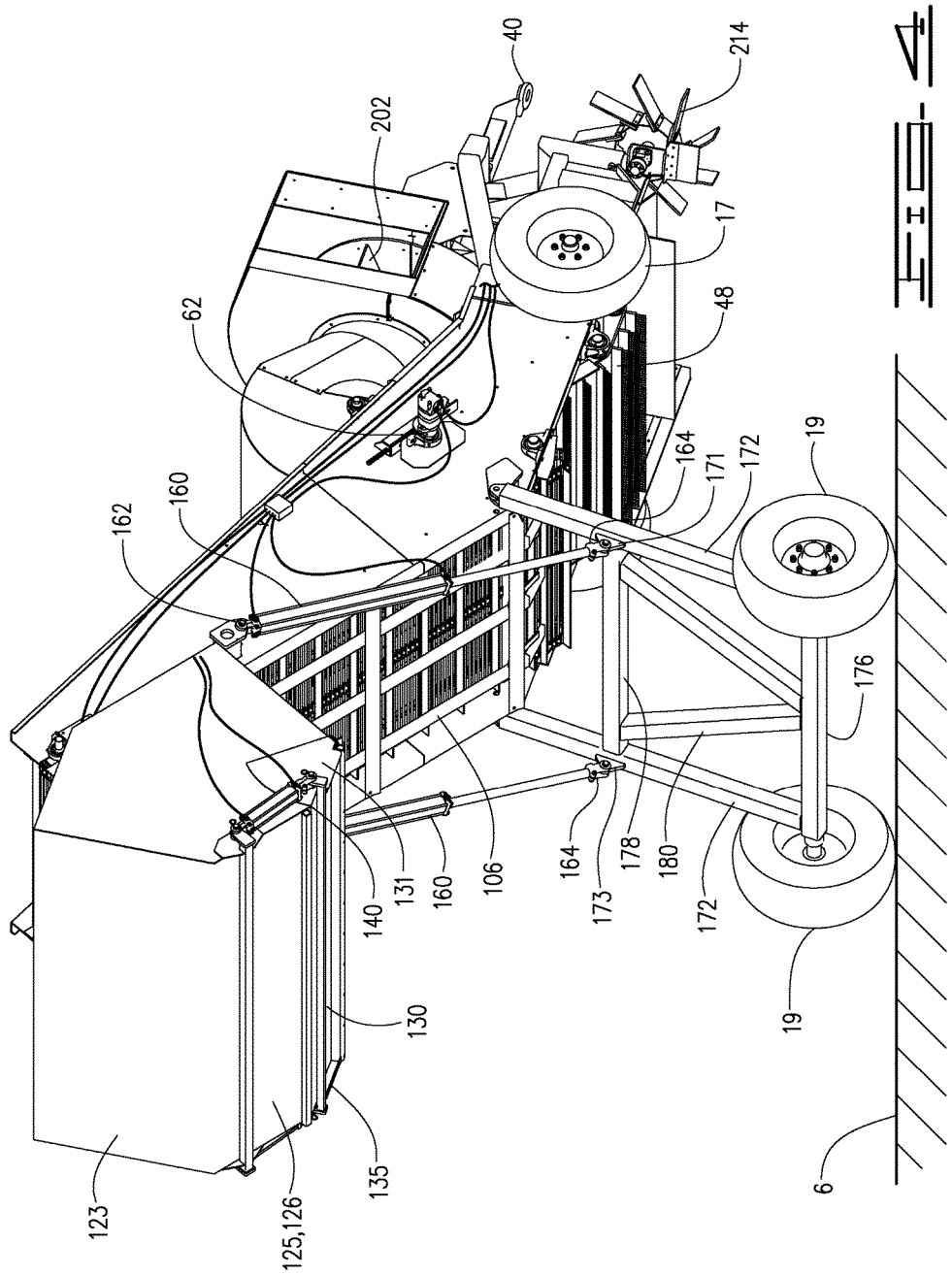
FIG. 4 is a perspective view of the row harvester in an elevated or dumping position.
Figure 11:
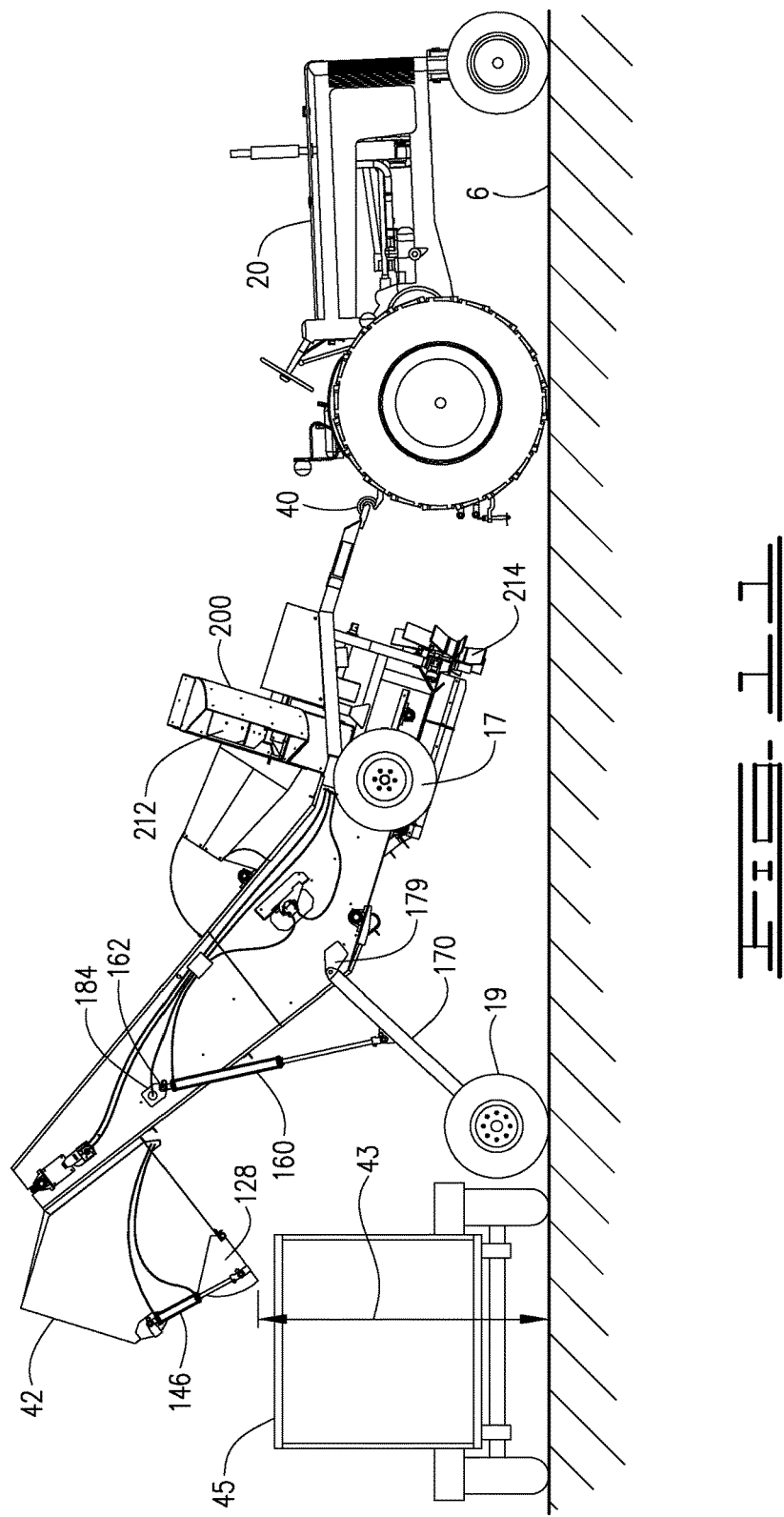
FIG. 11 is a side view of the row harvester in an elevated position of a conveyor support structure.
Figure 12:
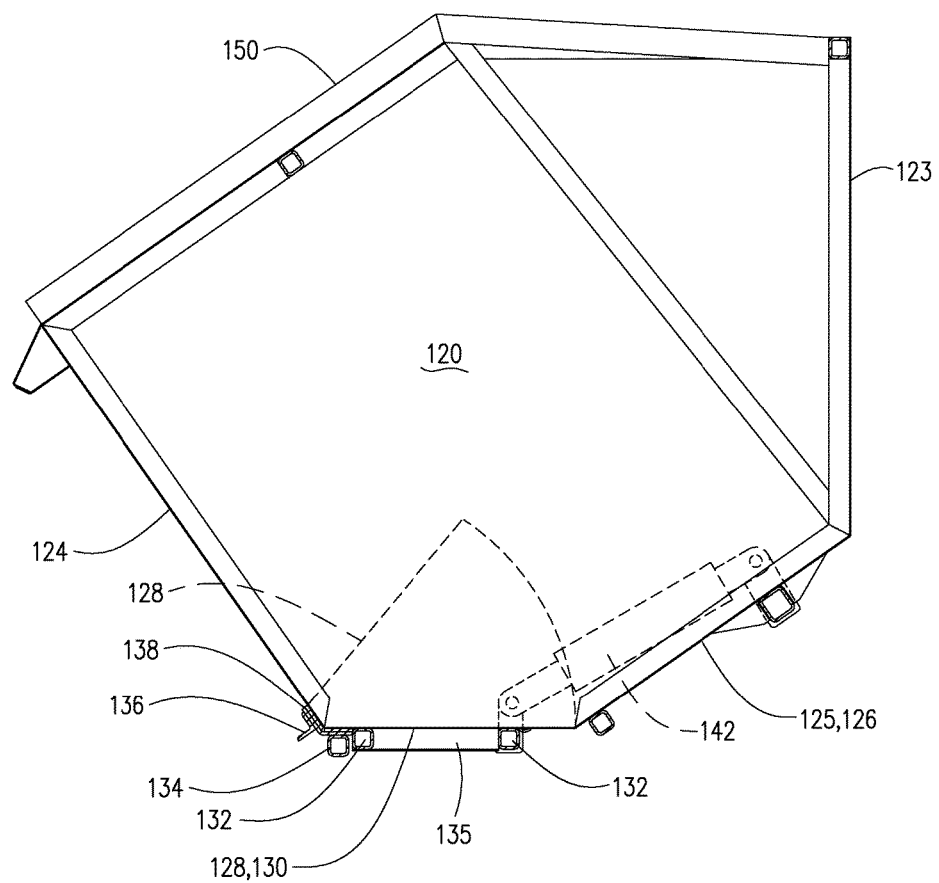
FIG. 12 is a cross section from line 13-13 of FIG. 5.
Figure 13:
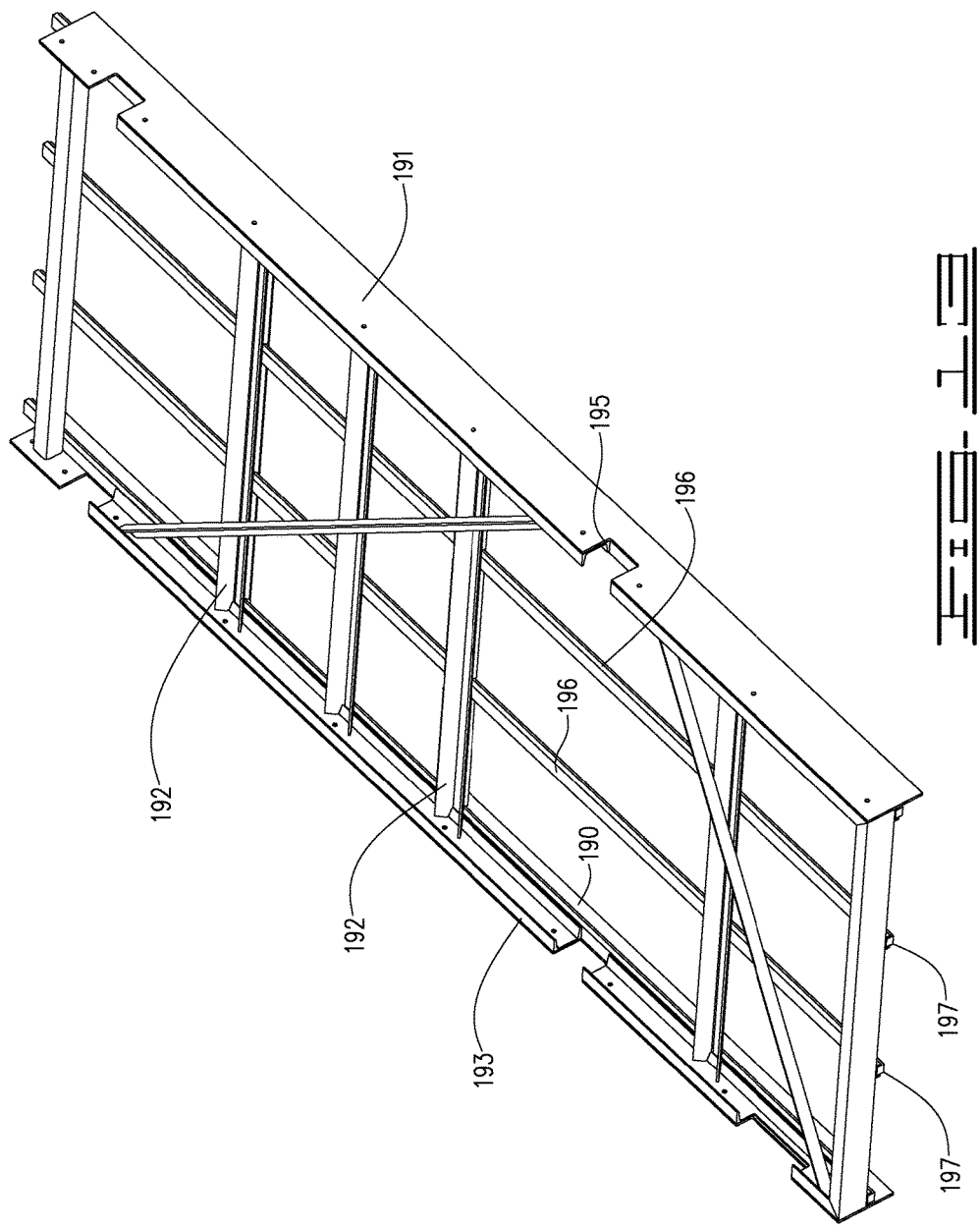
FIG. 13 is a view of the underside of a conveyor support frame.
Figure 14:
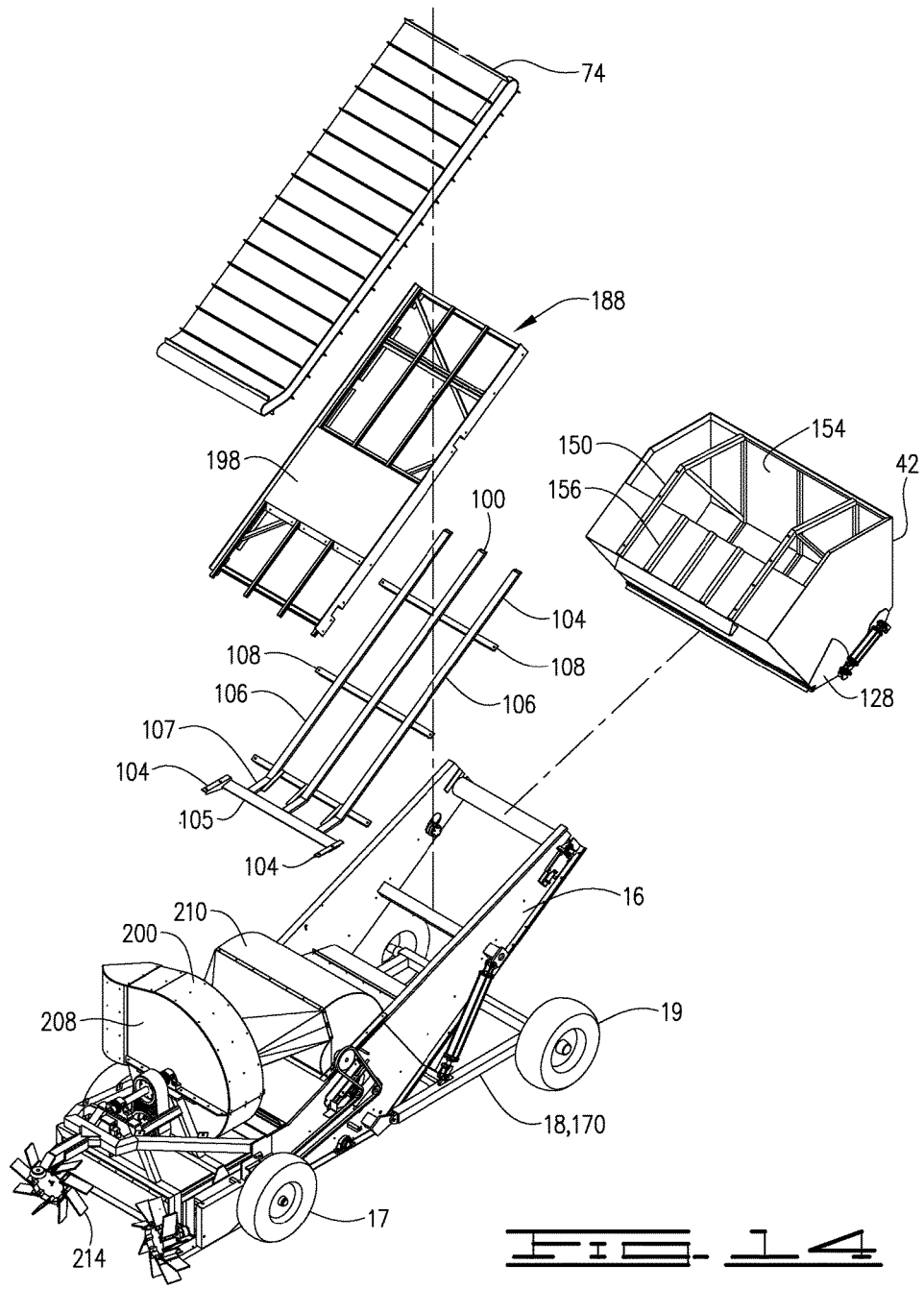
FIG. 14 is an exploded view of some primary components of the row harvester.

A collection hopper, or nut hopper 42 is mounted to the mobile frame 15 and is moveable therewith. Collection hopper 42 may be fixedly mounted with bolts or other connectors to mobile frame 15. Nuts will be delivered from conveyor system 10 into collection hopper 42. Once collection hopper 42 has been filled to a desired level, row harvester 5 can be elevated from the harvesting or lowered position shown in FIGS. 1-3 to an elevated, or dumping position shown in FIGS. 4 and 11. In the embodiment described, a bottom of collection hopper 42 can be raised to a height 43 of at least 9 feet, so that nuts in nut hopper 42 may be dumped into a trailer 45 attached to a pickup, tractor or other vehicle. When row harvester 5 is elevated and lowered between dumping and harvesting positions, first and second frame sections 16 and 18 pivot relative to each other.

Conveyor system 10 may include a rotary paddle 44. Rotary paddle 44 has plurality of rotating flaps 46, which may have slits therein to help direct nuts and debris from the orchard floor. Conveyor system 10 may also include a pickup or secondary conveyor 48. Pickup conveyor 48 has a conveyor belt 50 and a rear or pickup end 52 and forward or delivery end 54. Pickup conveyor 48 comprises a plurality of parallel upstanding bars or flights 56. Rotary paddle 44 feeds nuts on to pickup conveyor 48.

Conveyor system 10 also includes a second rotating paddle 60 with a plurality of flaps 61. Second rotating paddle 60 rotates in a direction opposite the pickup conveyor 44. Second rotating paddle 60 aids in debris removal by directing debris toward suction created by a fan which will be explained in more detail below.

Figure 6:
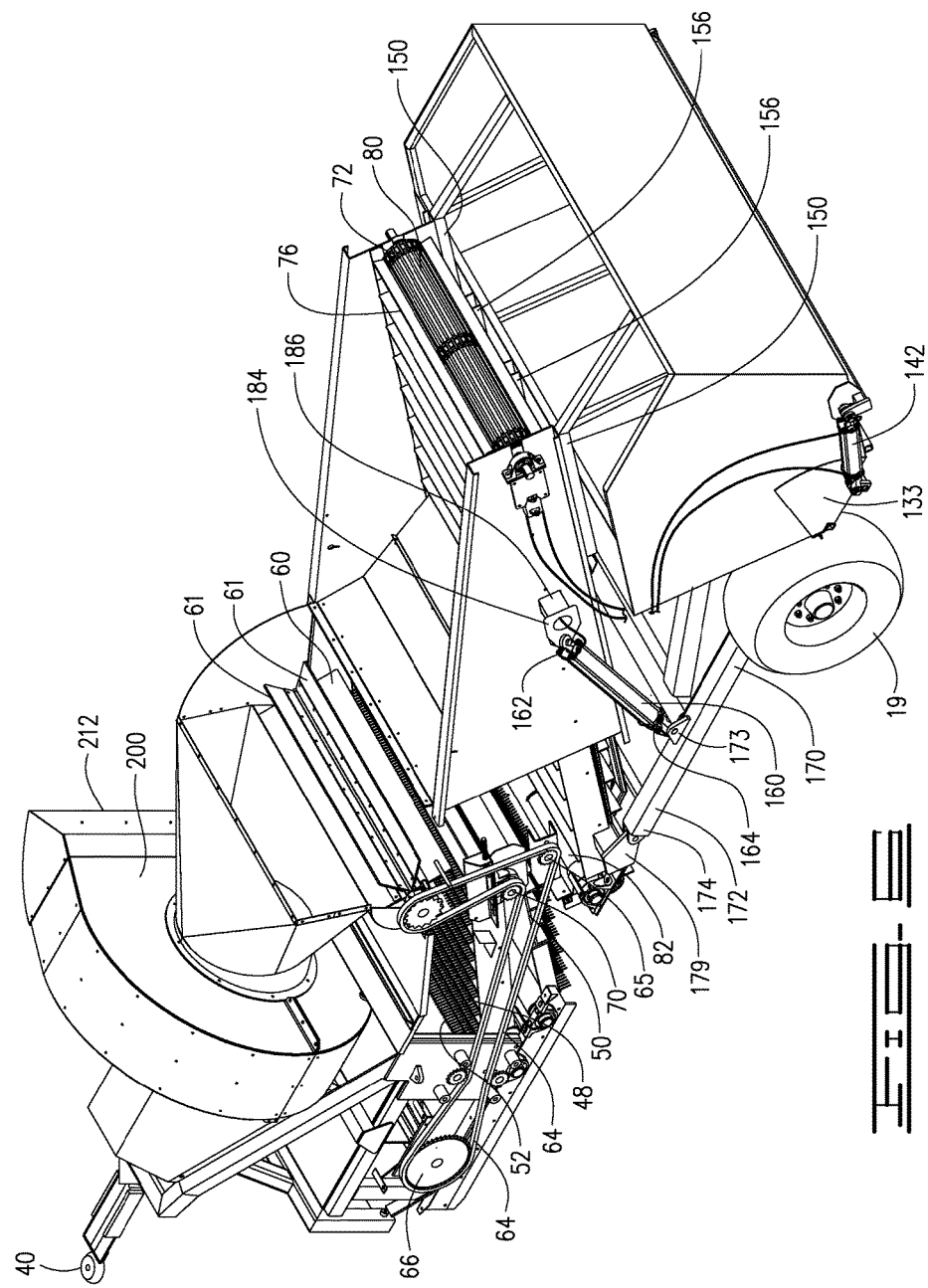
FIG. 6 is a view showing inside components of the row harvester.

Rotary paddle 44, pickup conveyor 48 and secondary rotating paddle 60 are driven in a manner known in the art, for example, with a hydraulic motor. In the embodiment discussed herein, a single hydraulic motor 62 drives the pickup paddle 44, the pickup conveyor 48 and the second rotating paddle 60. FIG. 6 shows a chain 64 driven by motor 62 through a sprocket 65. Sprocket 65 is connected by a shaft or other means known in the art to motor 62. Chain 64 is disposed about a rotary paddle sprocket 66 and secondary paddle sprocket 68. Chain 64 likewise engages a pickup conveyor sprocket 70 such that hydraulic motor 62 will rotate each of rotary paddle 44, pickup conveyor 48 and second rotating paddle 60. Hydraulic motor 62 may be driven in a manner known in the art and, for example, may be driven by the hydraulic system mounted on tractor 20.

Conveyor system 10 also comprises an upper or delivery conveyor 72. Conveyor 72 includes a conveyor belt 74 comprising upstanding ribs or flights 76 and a plurality of bars 78 therebetween. Delivery conveyor 72 has a forward or discharge end 80 and a rear or collection end 82. Flights 78 may be plastic or other material that is slidable with respect to other components of row harvester 5.

Conveyor belt 74 is driven by a hydraulic motor 86 in a matter known in the art. Motor 86 is driven by hydraulic system on tractor 20. Hydraulic motor 86 may be directly connected to drive shaft 84, or may drive a chain that rotates shaft 84. Drive shaft 84 may be referred to as forward shaft 84 that is rotated by motor 86. A roller 85 may be connected to or disposed about shaft 84. Roller 85 on drive shaft 84 may be a rubber coated or other types of roller that will create friction such that belt 74 disposed thereabout will rotate when shaft 84 is rotated. Conveyor belt 74 extends around rear or follower shaft 88. As is known in the art, the follower shaft 88 will rotate in a bearing 90 on both left and right sides of the row harvester 5. A roller 89 may be disposed about shaft 88.

Conveyor frame 92 comprises left side panel 94 and right side panel 96 each having outwardly extending flange 98 along a lower edge thereof. A conveyor slide 100 is mounted to left and right side panels 94 and 96. Conveyor slide 100 comprises a plurality of parallel longitudinally extending support beams 106 that are welded or otherwise connected to a forward support beam 105. Forward support beam 105 extends between bearing supports 104, which are connected to the left and right side panels 94 and 96. Longitudinal support beams 106 have angled portion 107 connected to forward support beam 105. A plurality of cross beams 108 connect to the plurality of longitudinally extending support beams 106 and provide rigidity for conveyor slide 100. Cross beams 108 may be connected to the outwardly extending flange 98 on both of panels 94 and 96.

Conveyor belt 74 does not have a straight upper run between rear and forward shafts 84 and 88 respectively. A depression, or sag, exists in conveyor belt 74 near rear shaft 88. The sag is built into conveyor belt 74 which allows for greater nut collection and fewer losses from pickup conveyor 44 which delivers nuts onto delivery conveyor 72. The sag creates what may be referred to a flat 109 at rear shaft 88 so that nuts will be gathered and delivered up the incline 111 that extends from flat 109 of conveyor 72. On a conveyor with straight upper run there is a greater possibility that nuts will bounce and fall downward due to the constant incline that exists on such a conveyor with a straight upper run. The upper run of conveyor 74 may be referred to as a sectional, or two part run with the generally flat or horizontal portion 109 leading to inclined portion 111.

A tensioner 110 may be utilized to provide additional tension if necessary. Tensioner 110 may include a tension beam 112 connected to a plate 114, which may in turn be connected to a bearing housing 118. Tension on drive shaft 84 may be adjusted moving the plate 114 with threaded rods or other means known in the art.

Nut hopper 42 comprises first and second or left and right sides 120 and 122 and front and rear panels 123 and 124 respectively. A bottom 125, is an openable and closeable bottom, and is moveable between open and closed positions. The open position of the bottom 125 is the dumping position and the closed position is the harvesting or collection position. Bottom 125 includes a bottom panel 126 and a trap door 128. The trap is moveable between open and closed positions to allow for the dumping of nuts collected in nut hopper 42. Trap door 128 comprises a door panel 130 welded or otherwise affixed to first and second door sides 131 and 133. One or more longitudinal beams 132 may be affixed to bottom panel 130 to provide rigidity thereto. Transverse beams 135 may be fixed to door panel 130 as well. A hinge 138, which may be a rubber hinge 138, is held in place by a first hinge support 134 and a second hinge support 136. First hinge support 134 may be bolted or otherwise connected to bottom panel 130, while second hinge support 136 is connected to rear panel 124. A forward edge 140 of door panel will meet or overlap bottom panel 126 in the closed position of the nut hopper 42.

Door 128 is moveable between open and closed positions with hydraulic cylinders 142 mounted to each side of the nut hopper 42. Hydraulic cylinders 142 have an inlet and outlet at the upper and lower ends 144 and 146 thereof and are connected hydraulically to the tractor 20 hydraulic system. Lower end 146 may be connected to a lug 145, which is connected to one of beams 132. Upper end 144 may be mounted to a lug 143, which is in turn connected to a cross beam 147. Cross beam 147 extends across nut hopper 42 and is connected to both of lugs 143 and to the bottom 128. When hydraulic pressure is applied at the upper end 144 hydraulic cylinder 142 will extend and cause door panel 130 to pivot about hinge 138 to the open, or dumping position. Hydraulic pressure applied to bottom 146 will cause door panel 130 to move to the closed, or collecting position.

Figure 5:
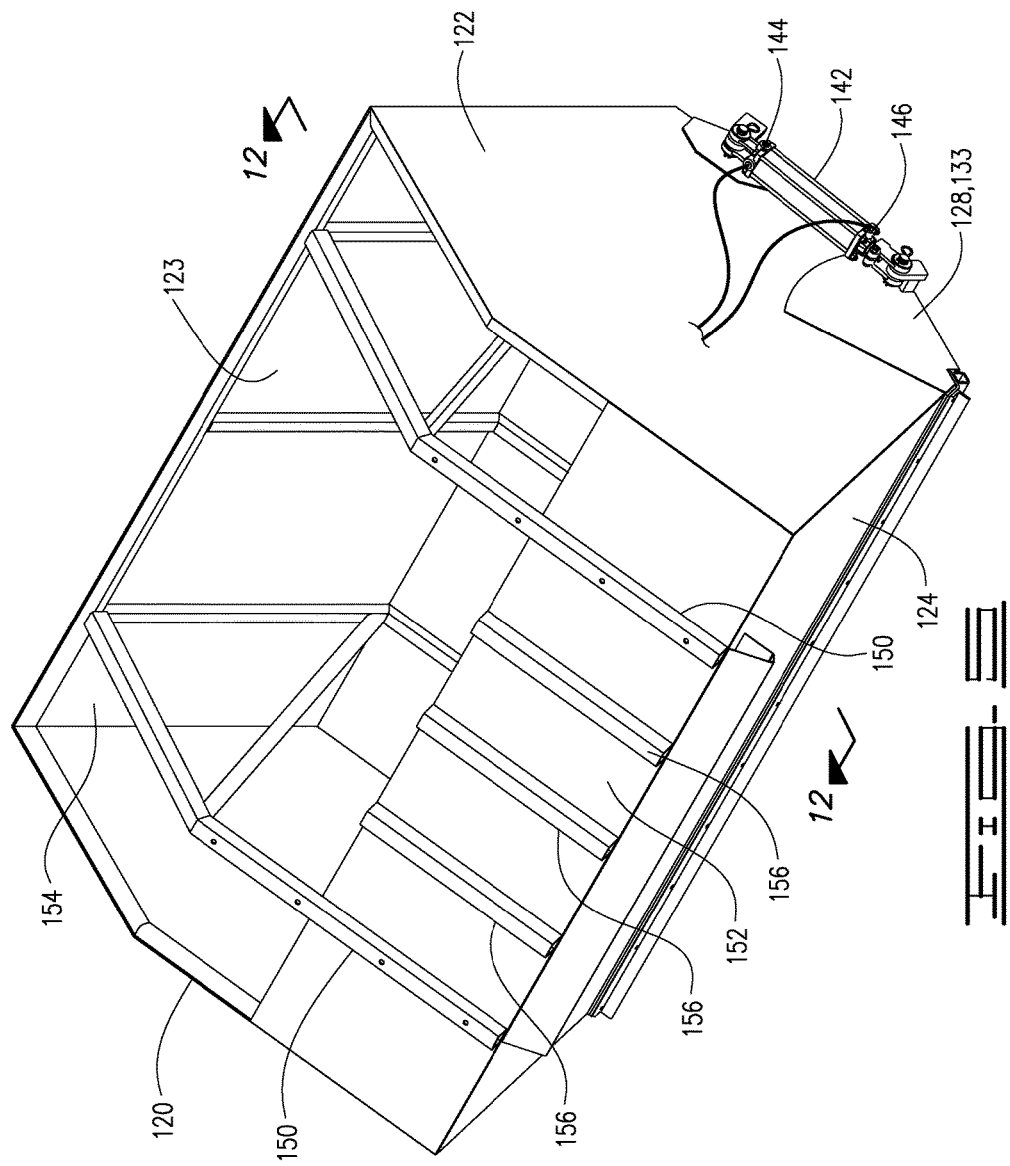
FIG. 5 is a perspective of the collection hopper of the row harvester.

A hopper support frame 148 may include a plurality of beams connected to the front, rear and side panels to provide strength to hopper 42. Support frame 148 includes a pair of connecting beams 150 that are connected to upper panel 152 of nut hopper 42. As shown in FIG. 5 nut hopper 42 thus defines an open top 154 which will receive nuts.

A plurality of u-shaped channels 156 are connected to upper panel 152 by welding on other means known in the art. U-shaped channels 156 are connected to the parallel support beams 106 on slide 102. Connecting beams 150 are bolted and/or welded to flanges 98 on left and right side panels 94 and 96 respectively.

An elevator system 159 mounted to mobile frame 15 will raise and lower nut hopper 42 between the lowered, harvesting position and the upper, or dumping position. Elevator system 159 may comprise hydraulic cylinders 160 positioned on both the right and left sides 35 and 37 of mobile frame 15. Hydraulic cylinders 160 have upper ends 162 and lower ends 164. Lower ends 164 are mounted to a rear wheel frame 170 which comprises second mobile frame section 16. Cylinders 160 are mounted at the lower ends 164 to lugs 171 and 173 on pivot beams 172 of rear wheel frame 170 respectively. A rear cross beam 176 extends between rear wheels 19. It is understood that rear wheels 19 may be rotationally mounted in a manner known in the art. A forward cross beam 178 extends between lugs 171 and 173. Diagonal braces 180 may be included, as well. Pivot beams 172 have forward ends 174 pivotally mounted to lugs 179. Lugs 179 are connected by welding or otherwise to a first cross brace 182. Upper ends 162 of hydraulic cylinders 160 are connected to lugs 184, which are welded or otherwise connected to a second cross brace 186.

A conveyor support frame 188 includes side panels 190 and 191 connected by a plurality of transverse beams 192. Side panels 190 and 191 have flanges 193 and 194 respectively. Panels 190 and 191 have cutouts 195 which will rest upon cross braces 182 and 186. A plurality of longitudinal braces 196 extend along the length of support frame 188. Longitudinal braces 196 may be u-shaped braces, and may have inserts 197 positioned therein along the length thereof. Inserts 197 may be of plastic or other material that will allow conveyor belt 74 to easily slide thereover. Support frame 188 may be constructed by welding, fastening or other known means. Conveyor support frame has an upper support panel 198. Conveyor support frame 188 is placed between the upper and lower runs of conveyor 74, and provides support thereto. Conveyor support frame may be bolted to side panels 134 and 136 and welded or otherwise fixed to cross braces 182 and 186.

A fan assembly 200 includes a fan 202 driven by power take off 204 connected to the tractor 20. If desired, an upper shaft 206 may be utilized to connect to a hydraulic pump such that all of the hydraulics can be manipulated and powered from the row harvester as opposed to tractor 20.

Fan assembly 200 includes a fan housing 208 and a vacuum hood 210 communicated therewith. The vacuum hood 210 has an opening 211 in the bottom thereof such that debris traveling on pickup conveyor 48 can be sucked therefrom and passed outwardly through the opening in fan housing 208. Secondary paddle wheel 60 cooperates with the vacuum hood to minimize the debris dropping onto delivery conveyor 72 by rotating in a direction opposite the travel of pickup conveyor 44 to direct sticks and other debris towards the vent or vacuum opening 211. Debris is passed outwardly through exhaust opening 212 in housing 208.

The operation of row harvester 5 may be explained as follows. Row harvester 5 is pulled along a wind row between trees in an orchard with tractor 20. A pair of side paddle wheels 214 that rotate toward a center of the row harvester 5 are utilized to help sweep and move nuts into the path of row harvester 5. Rotary paddle 44 will rotate and will pick up nuts and drop them onto pickup conveyor 48. Nuts will travel on pickup conveyor 48 and be delivered to delivery conveyor 72. Second rotating paddle 60 will rotate in a direction opposite the direction of travel of pickup conveyor 48. Second rotating paddle will aid in directing debris toward fan assembly 200. Fan assembly 200 creates suction such that debris traveling up pick up conveyor 48 will be sucked therefrom and will be blown out the exhaust 212 of fan assembly 200. The position of the row harvester and components thereof, may be referred to as the harvesting position.

Nuts will travel along the upper run of upper conveyor 72 and will be delivered into nut hopper 42 through the open top 154 thereof. This process is continued until nut hopper 42 reaches the desired capacity. Once nut hopper 42 reaches its capacity, hydraulic pressure is applied to the upper ends 162 of hydraulic cylinders 160. The application of pressure will extend hydraulic cylinders 160 and will cause second frame 18, also referred to as rear wheel frame 170, to pivot relative to first frame 16 which is also comprises the conveyor frame 92. Forward wheels 17 will be raised from the ground surface 6 and the nut hopper 42 will be lifted such that the bottom 125 thereof is lifted from the ground surface a sufficient distance to dump nuts into trailer 45. This position is the dumping position of row harvester 5. The bottom 125 may be lifted to the height required, and will raise it at least 9 feet off the ground surface 6. Once nut hopper 42 reaches a desired height, a trailer 45 is pulled thereunder. Hydraulic pressure is then applied to the upper ends 144 of hydraulic cylinders 142 to move door 128 to the open or dumping position. Forward wheels 17 are lifted from the ground surface 6 in the dumping position of the row harvester 5. Once all of the nuts have been dumped from nut hopper 42, pressure is applied to lower ends 146 of hydraulic cylinders 142 and door 128 is closed. Hydraulic pressure is then released from the upper ends 162 of hydraulic cylinders 160 which allows row harvester 5 to move to the harvesting position. As is apparent, the pivot beams 172 pivot about lugs 179 so that the first and second frames 16 and 18 are pivotable relative to each other. The extension of hydraulic cylinders 160 causes the pivoting motion thus raising nut hopper 42 to the desired height.

Figure 15:
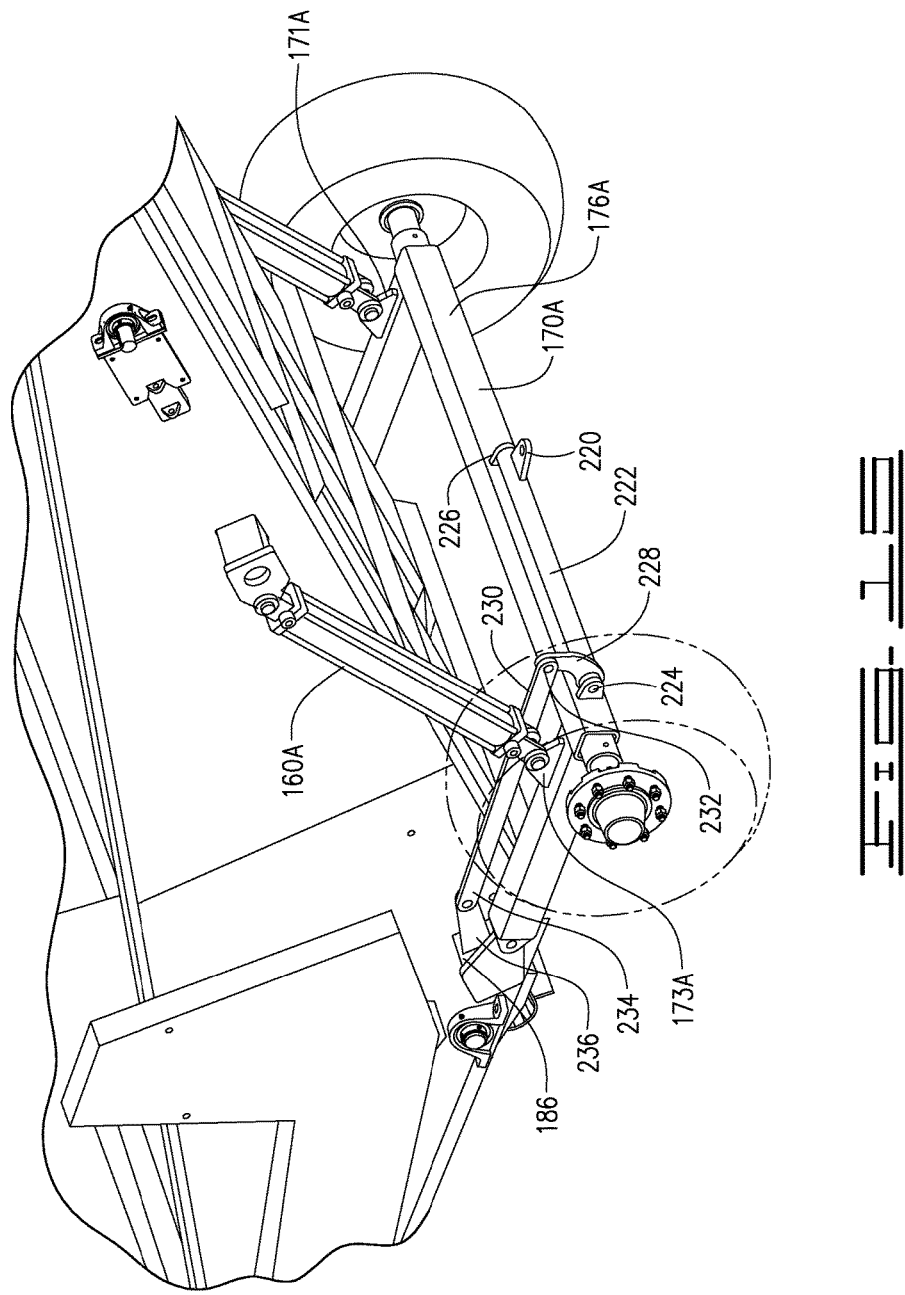
FIG. 15 shows an alternative arrangement for a wheel frame of the nut row harvester.
Figure 16:
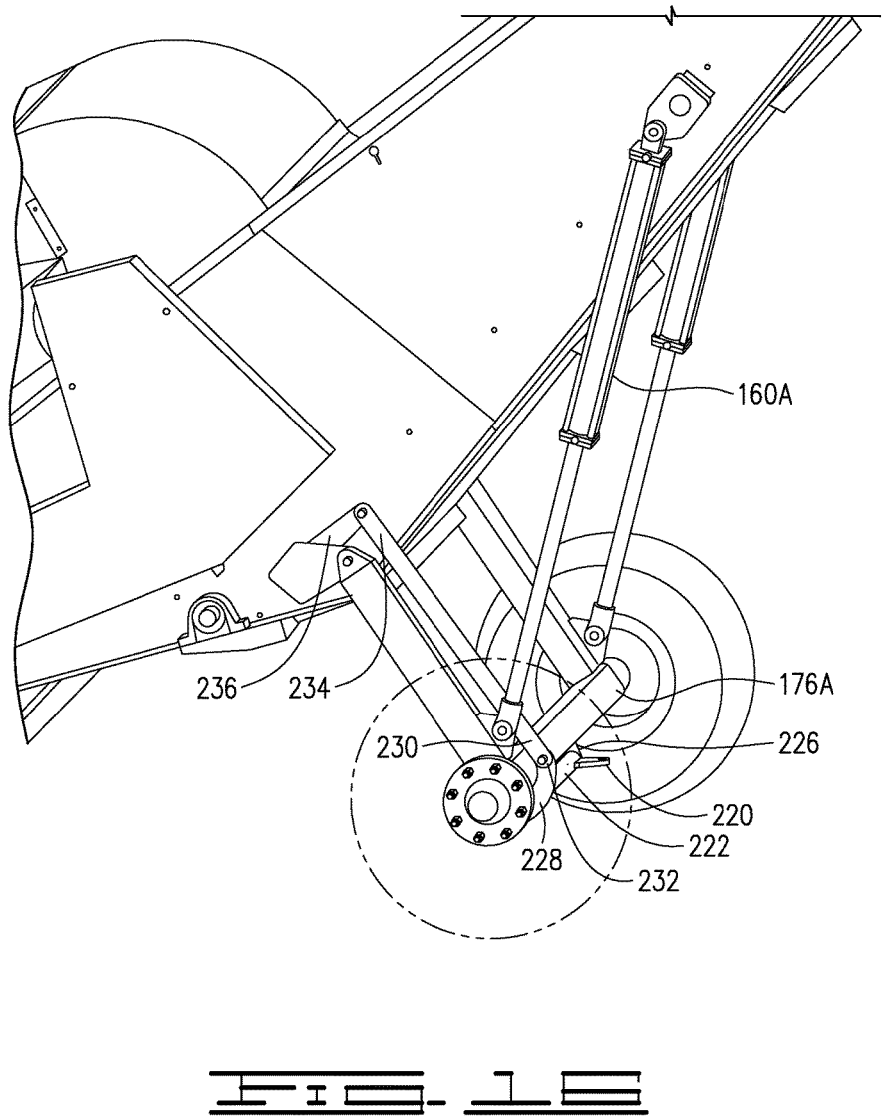
FIG. 16 shows the alternative arrangement for a wheel frame of the nut row harvester in a raised position.

FIGS. 15 and 16 show an alternative arrangement for a rear wheel frame 170A. In the embodiment shown therein, a trailer hitch 220 is connected to rear wheel frame 170A. Trailer hitch 220 is a self-leveling hitch 220 in that hitch 220 will maintain a level or horizontal position when row harvester 5 is moved between the raised and lowered positions. The raised position is shown in FIG. 16. Hitch 220 is connected to a rod 222 that is rotationally mounted to a lug 224 at one end and a lug 226 at the opposite end. A hook 228 is fixed to rod 222 and will rotate therewith. Pivot bar 230 is fixed at a first or rear end 232 to connecting hook 228. Second or forward end 234 of pivot bar 230 is connected to a lug 236 that is mounted to cross brace 186. Lugs 171A and 173A are moved closer to rear beam 176A that extends between rear wheels 19. As a result, the hydraulic cylinders 160A are shorter in length than cylinders 160. When row harvester 5 must be turned, hydraulic cylinders are actuated to lift forward wheels 17 from the ground. The rear end of conveyor 72A will raise and rear beam 176A will rotate. The rotatable connection of bar 222, however, will allow hitch 220 to stay level. Instead, bar 222 will rotate relative to beam 176A and as such hitch 220 will stay in the level or horizontal position. The alternative arrangement of FIGS. 15 and 16 may be used if it is desired to connect a trailer to the row harvester, and pull the trailer behind the row harvester as it picks up nuts or other product.

Thus, it is seen that the apparatus and methods of the present invention readily achieve the ends and advantages mentioned as well as those inherent therein. While certain preferred embodiments of the invention have been illustrated and described for purposes of the present disclosure, numerous changes in the arrangement and construction of parts and steps may be made by those skilled in the art, which changes are encompassed within the scope and spirit of the present invention as defined by the appended claims.

What is claimed is:

1. A nut row harvester comprising:
   a mobile frame connectable to a towing vehicle;
   a conveyor system mounted to the mobile frame;
   a nut hopper fixedly connected to and moveable with the mobile frame for receiving nuts from the conveyor system; and
   an elevator system configured to move the nut row harvester from a harvesting position to an elevated dumping position, wherein movement from the harvesting position to the elevated dumping position raises the nut hopper and a discharge end of the conveyor system.

2. The nut row harvester of claim 1, the conveyor system comprising:
   a pickup conveyor; and
   a delivery conveyor mounted to a first frame section and positioned to receive nuts from the pickup conveyor, wherein the elevator system comprises a pair of hydraulic cylinders each mounted at one end to the first frame section and at a second end to a second frame section.

3. The nut row harvester of claim 1, wherein the elevator system raises a discharge end of the conveyor system and the nut hopper simultaneously.

4. The nut row harvester of claim 1, wherein the nut hopper comprises:
   a bottom having a door moveable between open and closed positions; and
   an open top positioned to receive nuts from the conveyor system, the door being in the closed position when the nut hopper is in the harvesting position.

5. The nut row harvester of claim 4, wherein the elevator system will lift the nut hopper so that a bottom thereof is at least eight feet above the ground surface.

6. The nut row harvester of claim 1, the mobile frame being mounted on a pair of forward wheels and a pair of rear wheels, wherein movement from the harvesting position to the elevated dumping position results in lifting the forward wheels from a ground surface.

7. A nut row harvester comprising:
   a mobile frame for connecting to a towing vehicle;
   a pair of forward wheels mounted to the mobile frame;

a pair of rear wheels mounted to the mobile frame;
a delivery conveyor mounted to the mobile frame;
a nut hopper mounted to the mobile frame; and
an elevator connected to the mobile frame and configured to simultaneously lift a discharge end of the delivery conveyor and the nut hopper from a harvesting position to an elevated dumping position, wherein movement from the harvesting position to the elevated dumping position results in lifting the pair of forward wheels from the ground.

8. The nut row harvester of claim 7, wherein the mobile frame comprises first and second frame sections pivotably connected to each other.

9. The nut row harvester of claim 8, wherein the first frame section pivots relative to the second frame section when the delivery conveyor moves between the harvesting position and the dumping position.

10. The nut row harvester of claim 7 further comprising:
a pickup conveyor for delivering nuts to the delivery conveyor;
a first rotary paddle for directing nuts from the ground into the pickup conveyor; and
a second rotary paddle positioned above the pickup conveyor, wherein the first rotary paddle, the second rotary paddle and the pickup conveyor are driven by a single motor.

11. The nut row harvester of claim 7, the first frame section comprising a conveyor frame and the second frame section comprising a pair of longitudinal pivot beams pivotably connected at one end to the conveyor frame and at a second end to a cross beam located between the rear wheels.

12. The nut row harvester of claim 11, the elevator system comprising first and second hydraulic cylinders connected to first and second sides of the conveyor frame, wherein the longitudinal pivot beams are pivotable relative to the conveyor frame.

13. The row harvester of claim 7, the nut hopper comprising an open top, first and second sides and a bottom, the bottom comprising a trap door moveable from a closed to an open position for dumping nuts from the nut hopper.

* * * * *